(12) United States Patent
Berdich et al.

(10) Patent No.: US 12,049,158 B2
(45) Date of Patent: Jul. 30, 2024

(54) GUIDE DEVICE WITH LOCKING DEVICE

(71) Applicant: Volkswagen Aktiengesellschaft, Wolfsburg (DE)

(72) Inventors: Josef Berdich, Amberg (DE); Hermann Wein, Ebermannsdorf (DE); Helmut Kreuzer, Vilseck (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 136 days.

(21) Appl. No.: 17/381,816

(22) Filed: Jul. 21, 2021

(65) Prior Publication Data

US 2021/0354597 A1    Nov. 18, 2021

Related U.S. Application Data

(63) Continuation of application No. PCT/DE2020/100041, filed on Jan. 22, 2020.

(30) Foreign Application Priority Data

Jan. 22, 2019  (DE) .................... 10 2019 000 381.0

(51) Int. Cl.
  *B60N 2/015*   (2006.01)
  *B60N 2/075*   (2006.01)
  *B60N 2/08*    (2006.01)

(52) U.S. Cl.
  CPC ....... *B60N 2/0818* (2013.01); *B60N 2/01541* (2013.01); *B60N 2/0843* (2013.01); *B60N 2/0881* (2013.01); *B60N 2/075* (2013.01)

(58) Field of Classification Search
  CPC ............... B60N 2/015; B60N 2/01508; B60N 2/01516; B60N 2/01525; B60N 2/01541;
  (Continued)

(56) References Cited

U.S. PATENT DOCUMENTS 6,357,814 B1 *  3/2002  Boisset ................. B60N 2/206
                                                 296/65.13
10,195,963 B2   2/2019  Flick et al.
(Continued)

FOREIGN PATENT DOCUMENTS

CN    106573555 A    4/2017
CN    107107785 A    8/2017
(Continued)

OTHER PUBLICATIONS

International Search Report dated May 13, 2020 in corresponding application PCT/DE2020/100041.
(Continued)

*Primary Examiner* — Jonathan Liu
*Assistant Examiner* — Guang H Guan
(74) *Attorney, Agent, or Firm* — Muncy, Geissler, Olds & Lowe, P.C.

(57) ABSTRACT

A guide device of a vehicle having a first guide paired with a fixture, a second guide that is paired with a structure of the vehicle and forms a guide track along which the fixture is movably guided in opposite track directions. A locking device has a first lock paired with the fixture and second lock paired with the structure of an X-locking mechanism which is used to releasably lock a movement along the track directions. A primary lock is paired with the fixture and a secondary lock is paired with the structure of a Z-locking mechanism via which a movement in a third direction for a removal out of the second guide can be releasably locked. The locking device has at least a first actuator and a second actuator via which the X-locking mechanism and/or the Z-locking mechanism can be moved between a locking position and a release position.

9 Claims, 10 Drawing Sheets

(58) Field of Classification Search
CPC .... B60N 2/0155; B60N 2/075; B60N 2/0818; B60N 2/0843; B60N 2/0881; B60P 7/08
See application file for complete search history.

(56) References Cited

U.S. PATENT DOCUMENTS

| | | | |
|---|---|---|---|
| 10,562,414 B2 * | 2/2020 | Condamin | B60R 22/22 |
| 10,675,995 B2 | 6/2020 | Pietrzak et al. | |
| 10,850,644 B2 * | 12/2020 | Condamin | B60N 2/0722 |
| 10,850,645 B2 * | 12/2020 | Condamin | B60N 2/0732 |
| 10,882,420 B2 * | 1/2021 | Ricart | B60N 2/0715 |
| 10,889,208 B2 * | 1/2021 | Condamin | B60N 2/0818 |
| 10,906,431 B2 * | 2/2021 | Condamin | B60R 22/22 |
| 10,926,667 B2 * | 2/2021 | Condamin | B60N 2/072 |
| 11,007,905 B2 * | 5/2021 | Sonar | B60N 2/0843 |
| 11,225,201 B2 * | 1/2022 | Moulin | B60R 11/00 |
| 11,358,496 B2 * | 6/2022 | Carbone | B60N 2/08 |
| 11,440,482 B2 * | 9/2022 | Moulin | B60P 7/0815 |
| 2021/0354597 A1 * | 11/2021 | Berdich | B60N 2/01541 |

FOREIGN PATENT DOCUMENTS

| | | |
|---|---|---|
| DE | 102012017299 A1 | 5/2014 |
| EP | 1176047 A1 | 1/2002 |
| FR | 2864481 A1 | 7/2005 |
| WO | WO2005068247 A2 | 7/2005 |

OTHER PUBLICATIONS

Chinese Office Action dated Nov. 10, 2022 in corresponding application 202080009835.7.

* cited by examiner

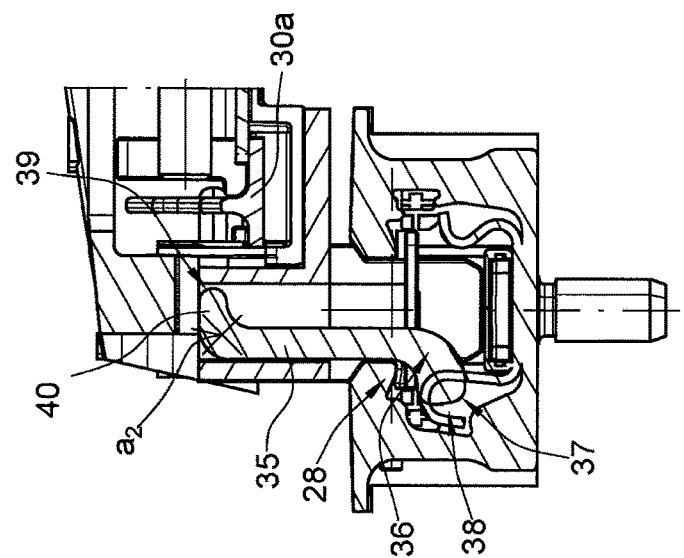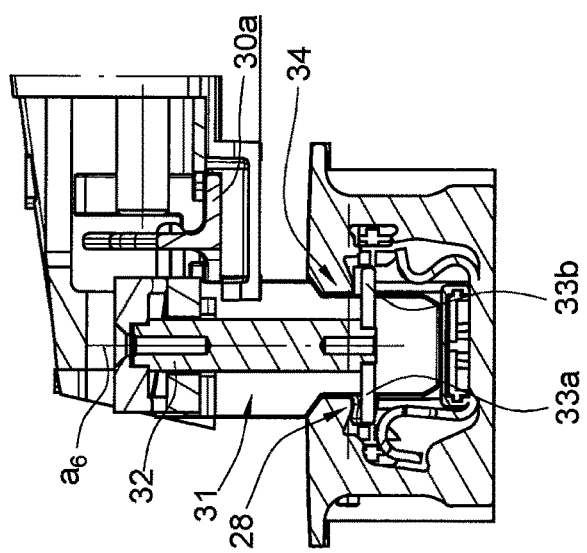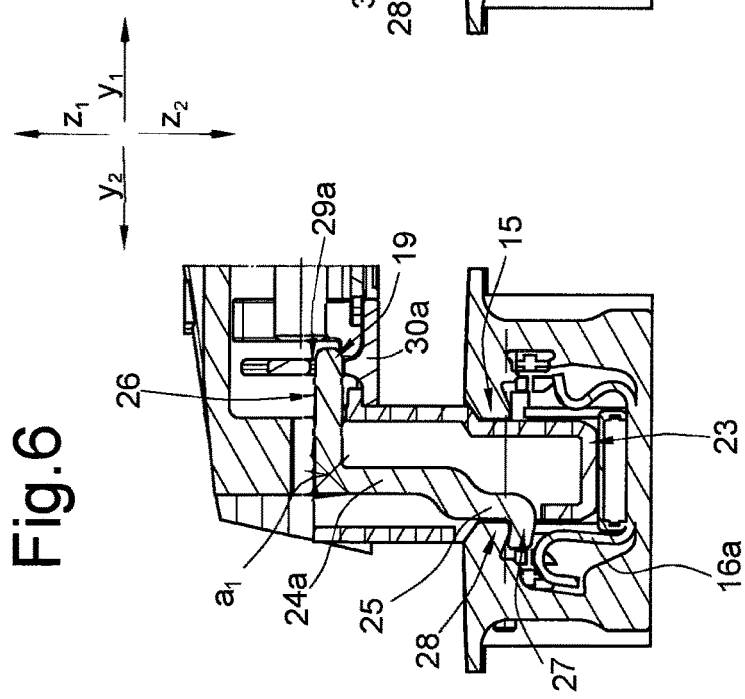

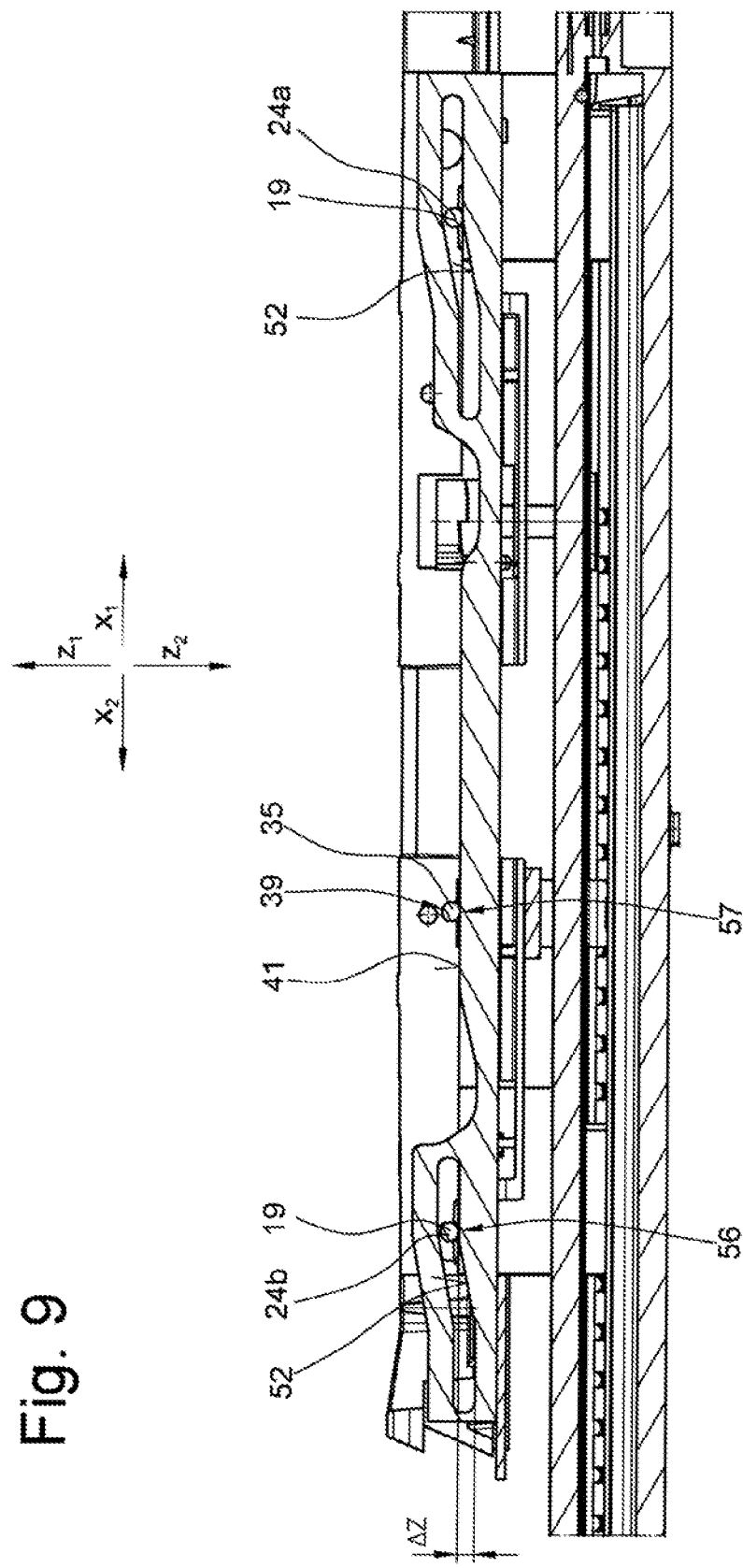

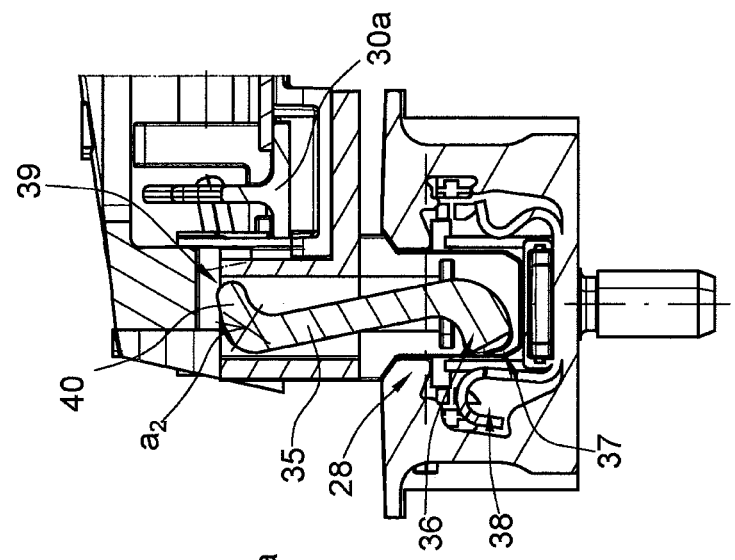
Fig. 11
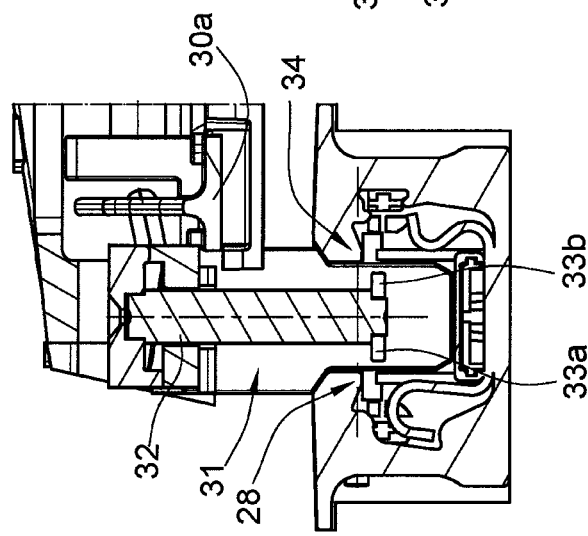
Fig. 10
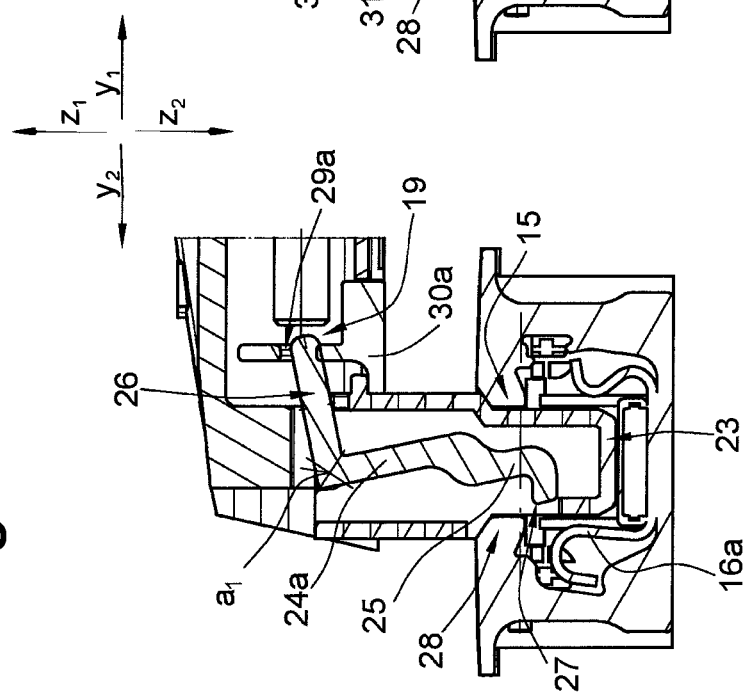

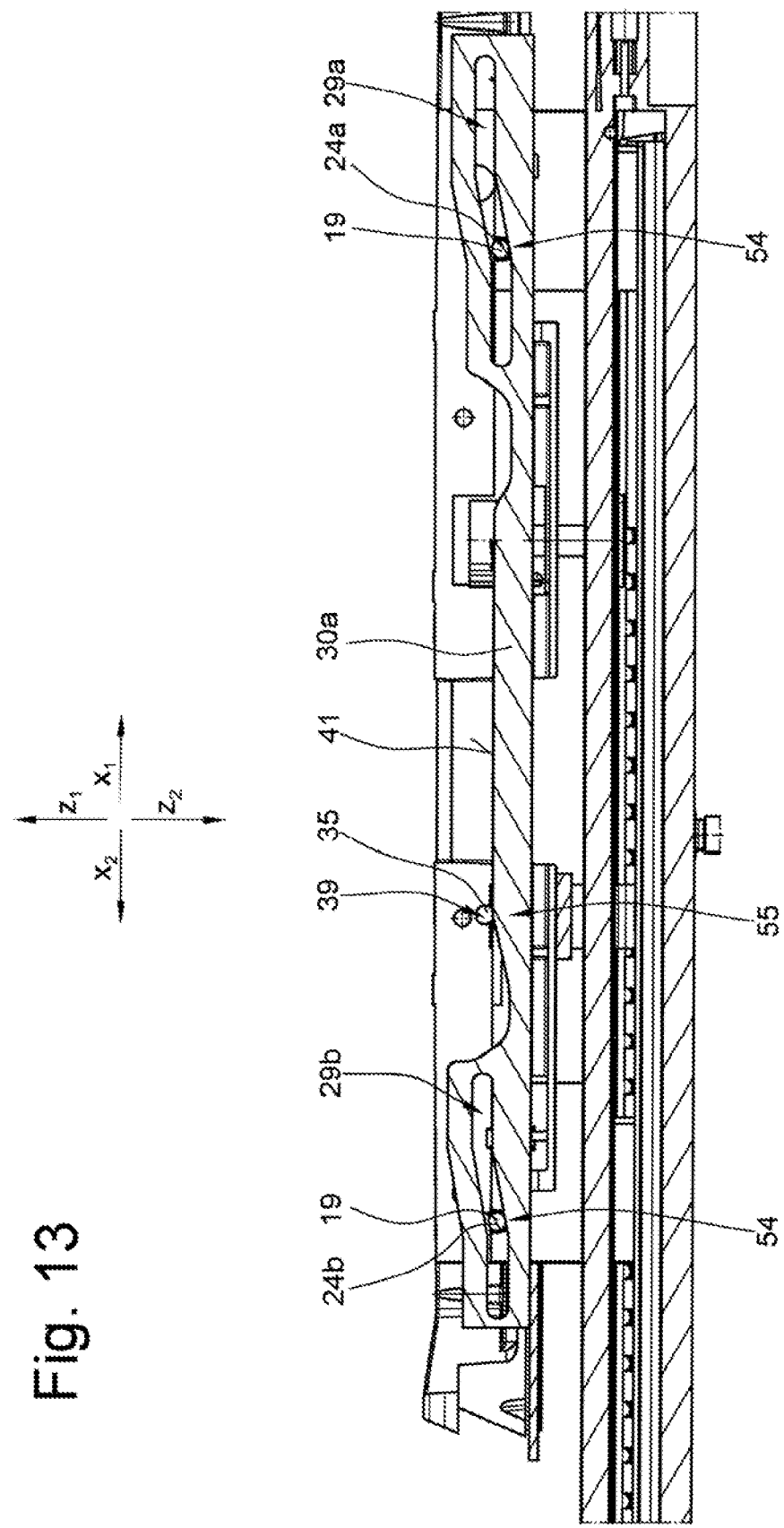

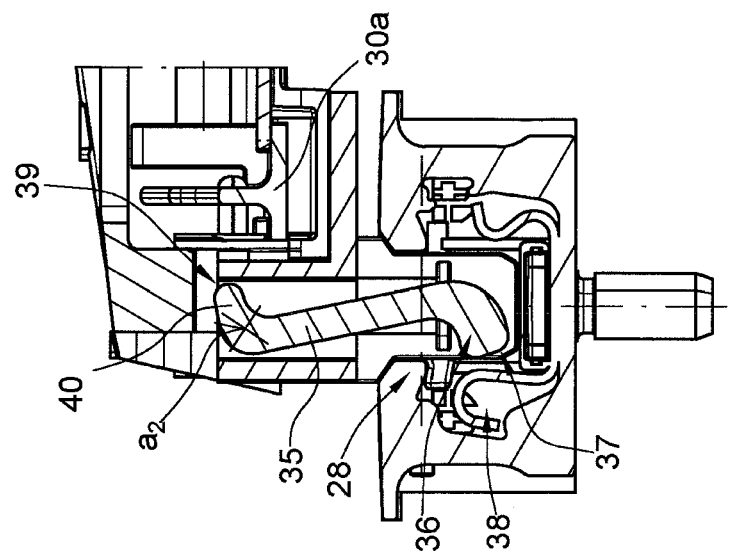
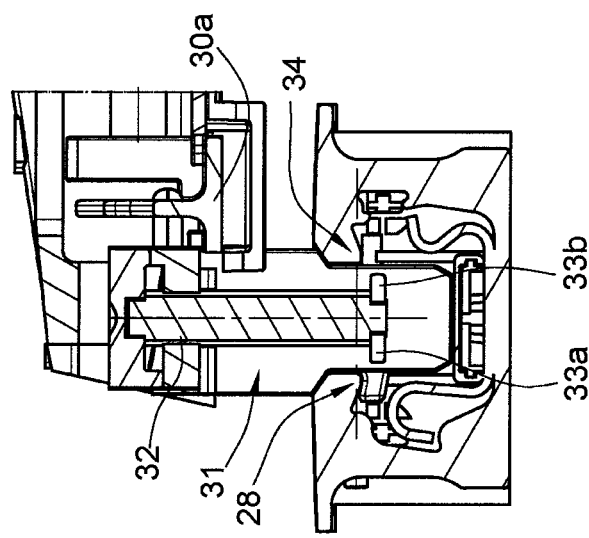
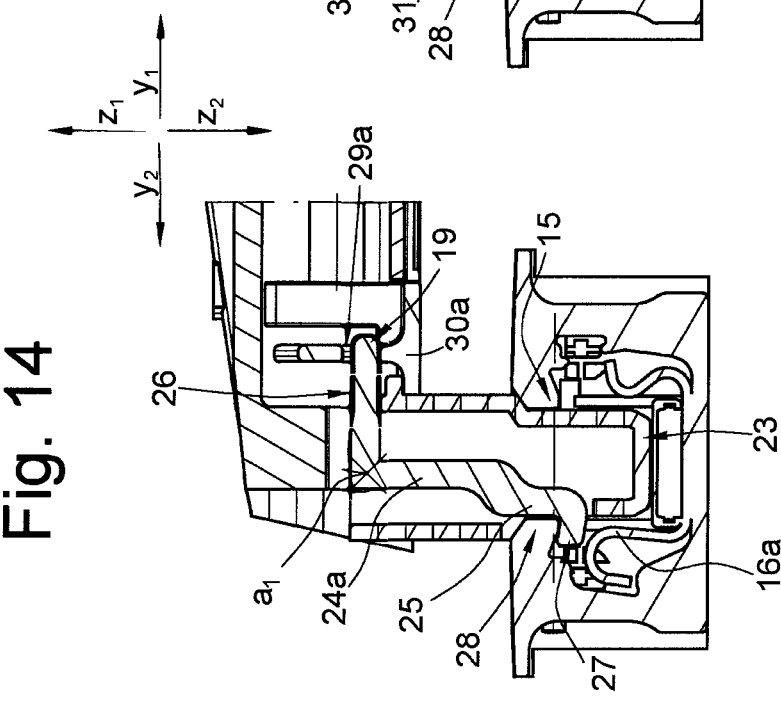

GUIDE DEVICE WITH LOCKING DEVICE

This nonprovisional application is a continuation of International Application No. PCT/DE2020/100041, which was filed on 22 Jan. 2020, and which claims priority to German Patent Application No. 10 2019 000 381.0, which was filed in Germany on 22 Jan. 2019, and which are both herein incorporated by reference.

BACKGROUND OF THE INVENTION

Field of the Invention

The present invention relates to a guide device of a vehicle. The vehicle is, for example, a land vehicle, an aircraft, or a watercraft.

Description of the Background Art

A guide device is known from prior public use. A fixture is movably guided on a guide track that is fixed to the vehicle and can be locked in different positions relative to the guide track. For this purpose, the guide device comprises a locking device that can be moved between a locking position and a release position by the means that a first or a second of two handles is actuated. By actuating a third handle, the fixture could be released from the guide track.

SUMMARY OF THE INVENTION

It is therefore an object of the present invention to provide a guide device in which handling is improved.

The guide device comprises a first guide that is associated with a fixture and a second guide that is associated with a structure of the vehicle and that form forms a guide track along which the fixture is movably guided in opposite track directions $x_1$, $x_2$. The first guide is composed of slide elements and/or roller elements, for example, that, together with the second guide, form a support such that the fixture is movably guided along the guide track.

The guide track is designed to be linear, for example. Alternatively, the guide track is designed to be curved. The guide track can alternatively also have straight and curved sections, for example.

The guide device comprises a locking device that includes an X-locking mechanism and a Z-locking mechanism. The X-locking mechanism has first lock associated with the fixture and a second lock associated with the vehicle structure, via which a movement of the fixture along the track directions $x_1$, $x_2$ can be releasably locked.

The Z-locking mechanism comprises a primary lock associated with the fixture and a secondary lock associated with the vehicle structure, via which a movement in a third direction for removal from the guide track can be releasably locked.

The locking device has at least a first actuator and a second actuator, with which the X-locking mechanism and/or the Z-locking mechanism can be moved between a locking position and a release position. On the basis of an actuation of the first actuator or the second actuator from an unactuated position into an actuated position, the X-locking mechanism can be moved into a release position.

On the basis of the actuation of the first actuator and the second actuator, according to the invention the Z-locking mechanism can be moved into a release position. During this process, the first actuator and the second actuator can be moved from an unactuated position into an actuated position sequentially, for example, in order to move the Z-locking mechanism from a locking position into a release position. Alternatively, the first actuator and the second actuator can be simultaneously actuatable. In the event of a movement of the Z-locking mechanism into the actuated position, the X-locking mechanism is automatically moved into the release position, for example.

In this way, the X-locking mechanism and Z-locking mechanism functions are unlockable without a separate actuator being provided for this purpose.

The second guide comprises, for example, at least one rail, in particular two rails. With a rail, guidance along a straight and/or a bent guide track can be realized. In addition, it is possible with the rail to provide the X-locking mechanism and the Z-locking mechanism with little additional effort.

For the X-locking mechanism, the rail can have slots that are arranged transversely to the course of the guide track, for example, and that interact with a latch of the fixture, which can be moved into engagement with at least one of the slots or out of engagement with the slots.

For the Z-locking mechanism, the rail has a web region that runs horizontally, for example, and that can be interlocked by the latch in order to prevent a movement in the Z-direction.

For example, the first lock interacts with at least one first control surface, and the primary lock interact with at least one second control surface, wherein the first control surface and the second control surface can be moved between a locking position and a release position. The first control surface and the second control surface can be associated with one control element or with different control elements that can be moved separately or together. One or more first control surfaces and/or second control surfaces can be implemented on each control element. An end region of a movable latch, for example, can be controlled by the control surface in such a manner that it can be moved by the control surface into the locking position and/or into the release position when the control element with the control surface moves relative to the latch.

The first control surface and the second control surface are associated with, for example, one control element, which can be moved between a locking position, a first release position, and a second release position. In the first release position, only the X-locking mechanism, for example, is moved into the release position so that the fixture can be moved in both track directions. In the second release position, the Z-locking mechanism and if applicable also the X-locking mechanism, for example, are moved into the release position, so that the fixture can additionally be removed from the guide track.

According to one embodiment, the first control surface and/or the second control surface is/are associated with a gate. The gate has a first guide surface and an opposite second guide surface. If, for example, one region of a latch is accommodated in the gate, then the movement of the latch from the locking position into the release position can be controlled by the first guide surface, and the reverse movement from the release position into the locking position can be controlled by the second guide surface of the gate.

The control element can be moved by a certain amount upon actuation of the first actuator or the second actuator, and the control element is additionally displaced by the same amount upon subsequent actuation of the other respective actuator. In this way, the control element can be shifted upon the successive actuation or alternatively the simultaneous actuation of the first actuator and the second actuator.

The control element can be secured at least in the first release position and/or in the second release position. In this way, it is possible to prevent that a spring-loaded latch, for example, of the first lock or of the primary lock automatically moves back into the locking position when the actuator are returned into the unactuated position.

The fixture comprises, for example, an adjustment mechanism, the actuation of which allows the securing of the control element to be releasable, wherein the adjustment mechanism is arranged such that the adjustment mechanism is actuated when the fixture is placed in the second guide.

The second guide can comprise two guide rails, and the first guide can comprise at least one slide element or roller element interacting with each guide rail.

The first lock and/or the primary lock comprise, for example, at least one latch that can move between the locking position and the release position. The latch can be supported such that it can be pivoted or alternatively can be moved linearly. In the locking position, the latch is engaged with the second lock or the secondary lock. In the release position, the latch is disengaged from the second lock or the secondary lock.

Features that are only described, shown, or disclosed in relation to an exemplary embodiment can, within the scope of the invention, also be provided in any other exemplary embodiment of the invention. Exemplary embodiments that are altered in this manner are included by the invention, even if they are not shown in the drawings.

All disclosed features are essential per se for the invention. The disclosure content of the cited documents and the prior art devices described are herewith incorporated in full in terms of content in the disclosure of this application, including for the purpose of incorporating one or more features of the subject matter disclosed there into one or more claims of the present application. All such altered exemplary embodiments are included by the invention, even if they are not shown in the drawings.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6 is a sectional representation along section line A-A in FIG. 2, FIG. 7 is a sectional representation along section line B-B in FIG. 2, FIG. 8 is a sectional representation along section line C-C in FIG. 2, FIG. 9 is a sectional representation along section line L-L in FIG. 4, FIG. 10 is a sectional representation along section line G-G in FIG. 4, FIG. 11 is a sectional representation along section line H-H in FIG. 4, FIG. 12 is a sectional representation along section line I-I in FIG. 4, FIG. 13 is a sectional representation along section line K-K in FIG. 3, FIG. 14 is a sectional representation along section line D-D in FIG. 3, FIG. 15 is a sectional representation along section line E-E in FIG. 3, and FIG. 16 is a sectional representation along section line F-F in FIG. 3.

DETAILED DESCRIPTION

The guide device as a whole is labeled with reference symbol 10 in the figures.

Figure 1:
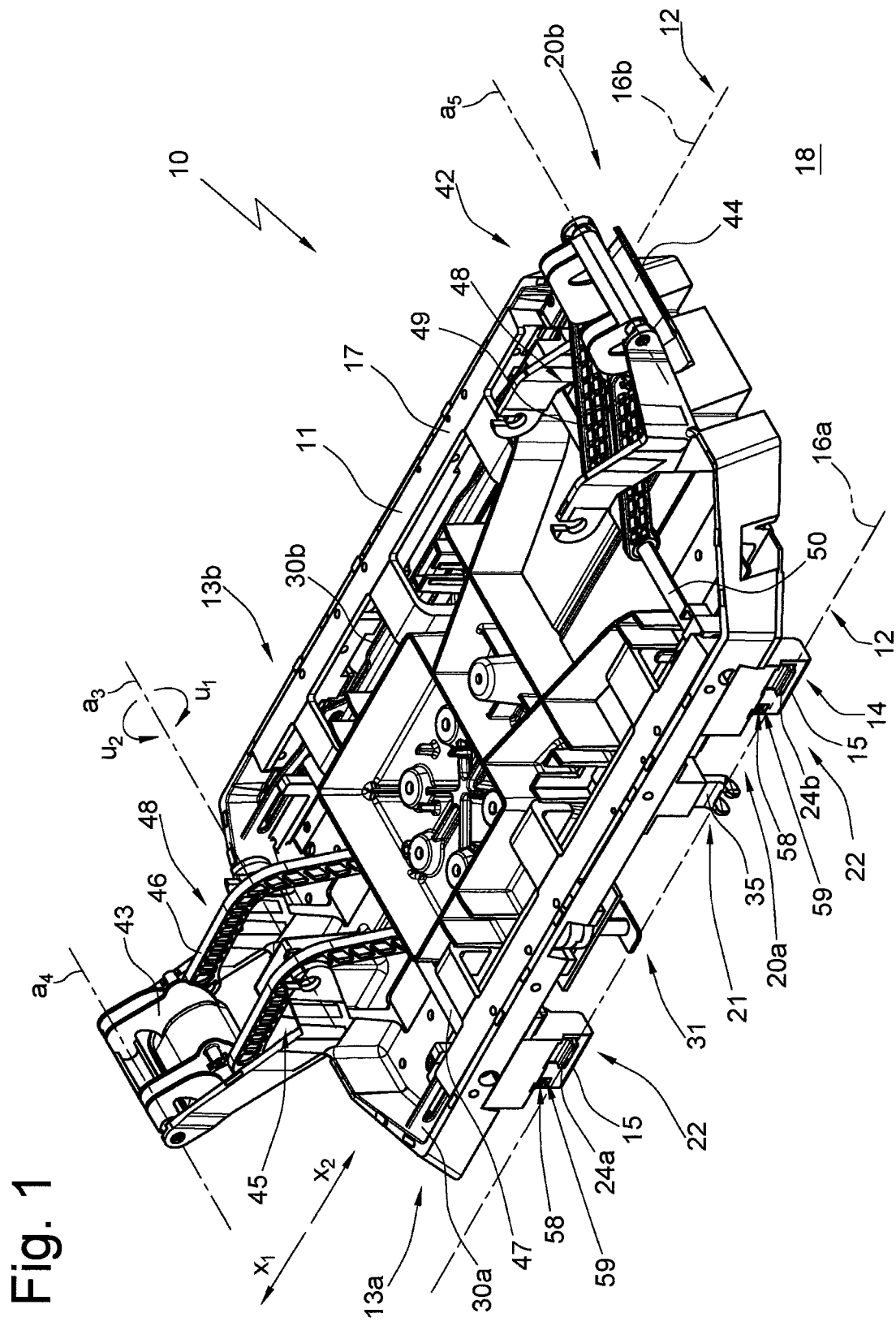
FIG. 1 is a perspective representation of a fixture, wherein the parts on the vehicle structure side of the guide device and of the locking device are not shown.
Figure 2:
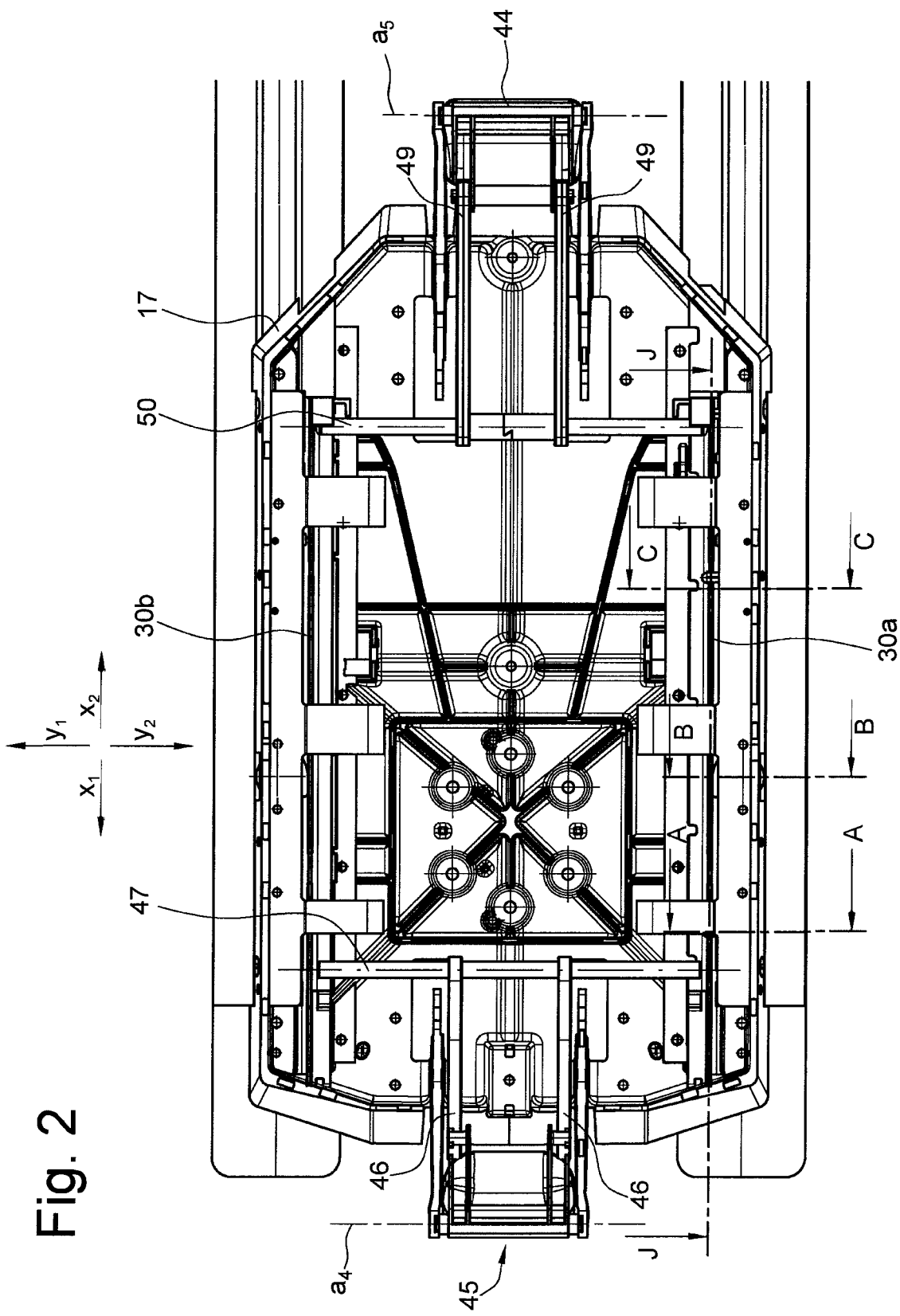
FIG. 2 is a top view of the fixture from FIG. 1.
Figure 3:
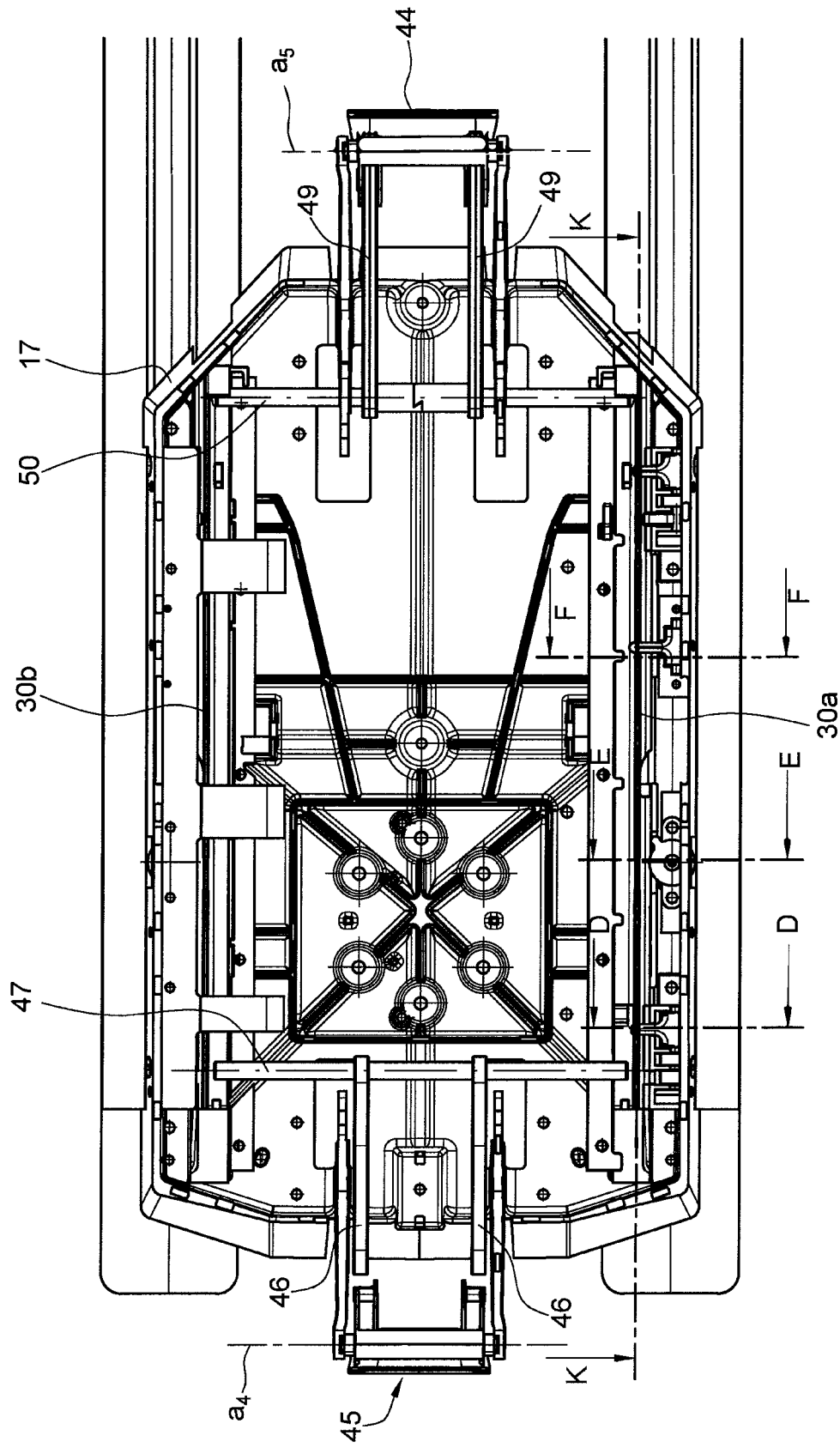
FIG. 3 is a top view of the fixture from FIG. 1, wherein one handle is actuated.
Figure 4:
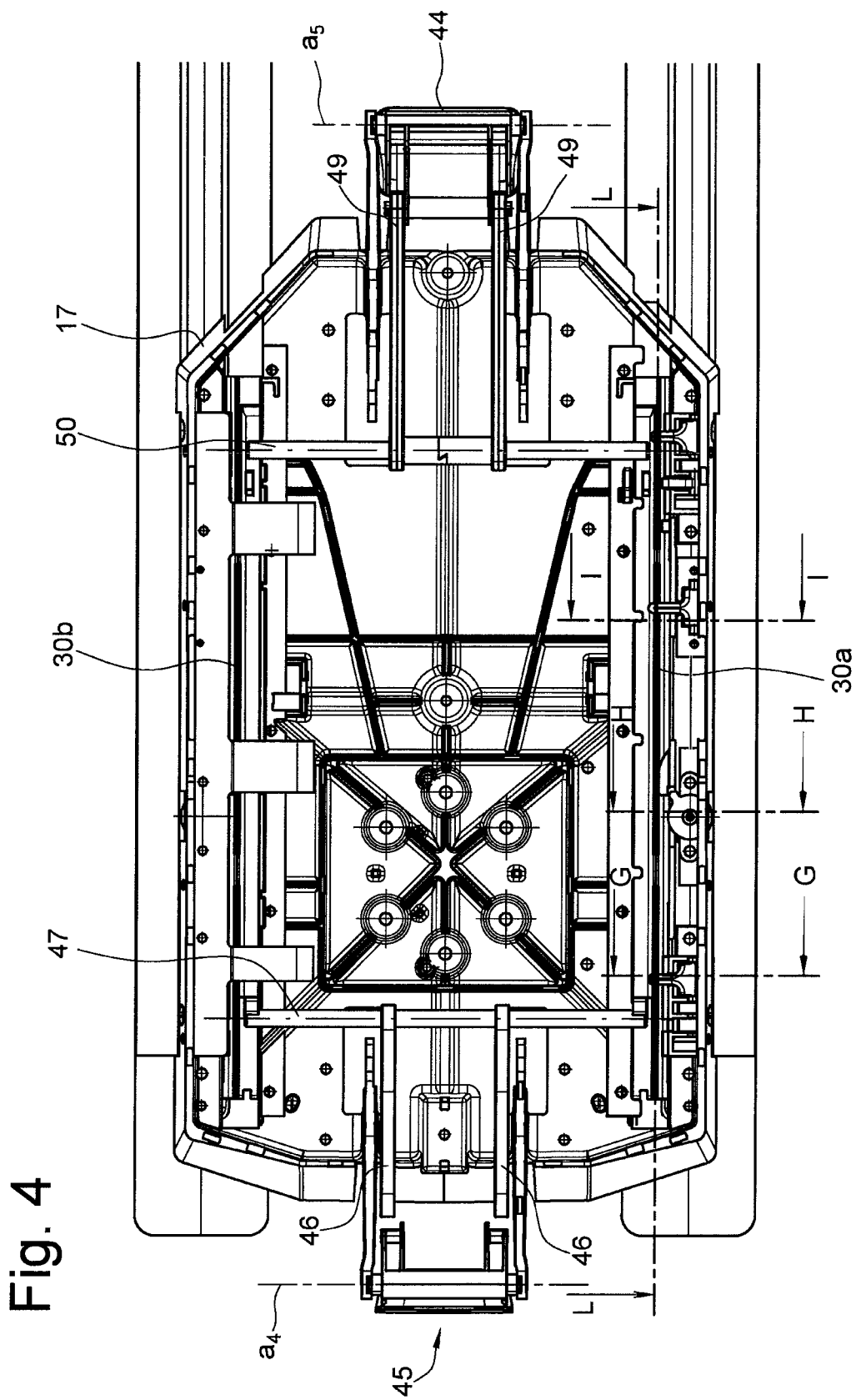
FIG. 4 is a top view of the fixture from FIG. 1, wherein both handles are actuated.

In FIG. 1, a fixture 11 of a vehicle is shown with the guide device 10 according to the invention. For the sake of clarity, the fixture is shown only partially. Second guide 12 of the guide device 10 is represented only by a dotted-and-dashed line. The second guide 12 interacts with first guide 14 of the fixture 11.

The first guide is composed of projections 15 in the present exemplary embodiment. The projections 15 are held on a base element 17 of the fixture 11 and protrude in direction $x_2$ with respect to the base element 17. The projections 15 can be brought into engagement with guide rails 16a and 16b of the second guide 12. The guide rails 16a and 16b run on a structure 18 of the vehicle, in the present exemplary embodiment on the floor of the vehicle, in a straight line in the direction $x_1$ or $x_2$.

By means of the projections 15 and the guide rails 16a and 16b, the fixture 11 is movably guided in the directions $x_1$ and $x_2$. A region 23 of the projection 15 interacts, as per FIG. 6, with the rail 16a in such a manner that movement in the direction $z_2$ and in the directions $y_1$ and $y_2$ is not possible, but such that movement in the directions $x_1$ and $x_2$ as well as in the direction $z_1$ is indeed possible.

The guide device 10 comprises locking devices 20a and 20b on both sides 13a and 13b of the base element 17. The locking device 20a is described in the figures. Even though the locking device 20b is not described here, it is in fact designed in the same manner as the locking device 20a.

Each of the locking devices 20a and 20b comprises an X-locking mechanism 21, with which a movement in the directions $x_1$ and $x_2$ along the guide rails 16a and 16b formed by the second guide can be locked, as well as a Z-locking mechanism 22, with which a movement in the direction $z_1$ can be locked, so that the fixture 11 cannot be removed from the guide rails 16a and 16b. When the X-locking mechanism 21 and the Z-locking mechanism 22 of the locking devices 20a and 20b are in the locked position (see FIG. 2 and FIGS. 5 to 8), the fixture 11 cannot be moved in any spatial direction.

If the X-locking mechanism 21 is in the release position, the fixture 11 can be moved in the directions $x_1$ and $x_2$.

If the Z-locking mechanism 22 is relocated into the release position, the fixture 11 has an additional degree of freedom in direction $z_1$. The fixture 11 can be removed from the guide rails 16a and 16b in direction $z_1$ and be put back into the guide rails 16a and 16b in direction $z_2$.

In FIG. 1, latches 24a and 24b of the Z-locking mechanism 22 of the locking device 20a can be seen that are supported on the base element 17 so as to be pivotable about a pivot axis $a_1$. The latch 24a is implemented as a two-armed lever (see FIG. 6)—corresponding to the latch 24b, which is designed in the same manner—and comprises a lever arm 25 with a hooked end region 27 as well as a lever arm 26. The end region 27 of the lever arm 25 engages beneath an overhang 28, which extends in the x-direction, of the second guide 12, thereby preventing movement in direction $z_1$. Movement in the direction $x_1$ and $x_2$ is not prevented by the engagement. An end region 19 of the second lever arm 26 is in engagement with a control surface 52 of a gate 29a of a control element 30a. By means of the control element 30a, the latch 24a can be moved into engagement with the overhang 28 or out of engagement with the overhang 28. The latch 24b is in engagement with a gate 29b of the control element 30a in a comparable manner to the latch 24a.

In the same manner as the latches 24a and 24b of the locking device 20a, the latches 24a and 24b of the locking device 20b are in engagement with gates 29a and 29b of a control element 30b, and can be moved into engagement or out of engagement with the guide rail 16b or the overhang 28 of the secondary lock.

In FIG. 7, a backlash compensation device 31 is shown on the side 13a of the base element 17. Even though it is not shown, a backlash compensation device 31, which is designed in the same manner as the device shown, is likewise present on the side 13b. The backlash compensation device 31 comprises a cylindrical body 32, which is provided with anchor elements 33a and 33b in an end region. The anchor element 33a interacts with the overhang 28, and the anchor element 33b interacts with an overhang 34 of the second guide, by which means a backlash compensation is accomplished in the Z-direction.

At an upper region, the body 32 is held on the base element 17 about a pivot axis $a_6$. Springs load the anchor elements 33a and 33b in direction $z_1$ against the overhangs 28 and 34, thereby preventing backlash in the Z-direction. The anchor elements 33a and 33b can be moved into engagement or out of engagement with the overhangs 28 and 34 as a function of the position of the control elements 30a and 30b.

A latch 35 of the X-locking mechanism 21 implemented as a two-armed lever can be seen in FIG. 1 and FIG. 8. The latch 35 has a lever arm 36 whose end region 37 is designed such that it can be brought into engagement with at least one slot 38 of a multiplicity of slots 38 that are incorporated in the guide rail 16a and extend transversely to the direction of extent $x_1$, $x_2$ of the guide rail 16a. In this way, a movement of the fixture 11 in the directions $x_1$ and $x_2$ can be prevented with the latch 35. As per FIG. 8, the end region 37 of the latch 35 is in engagement with two slots 38.

Figure 5:
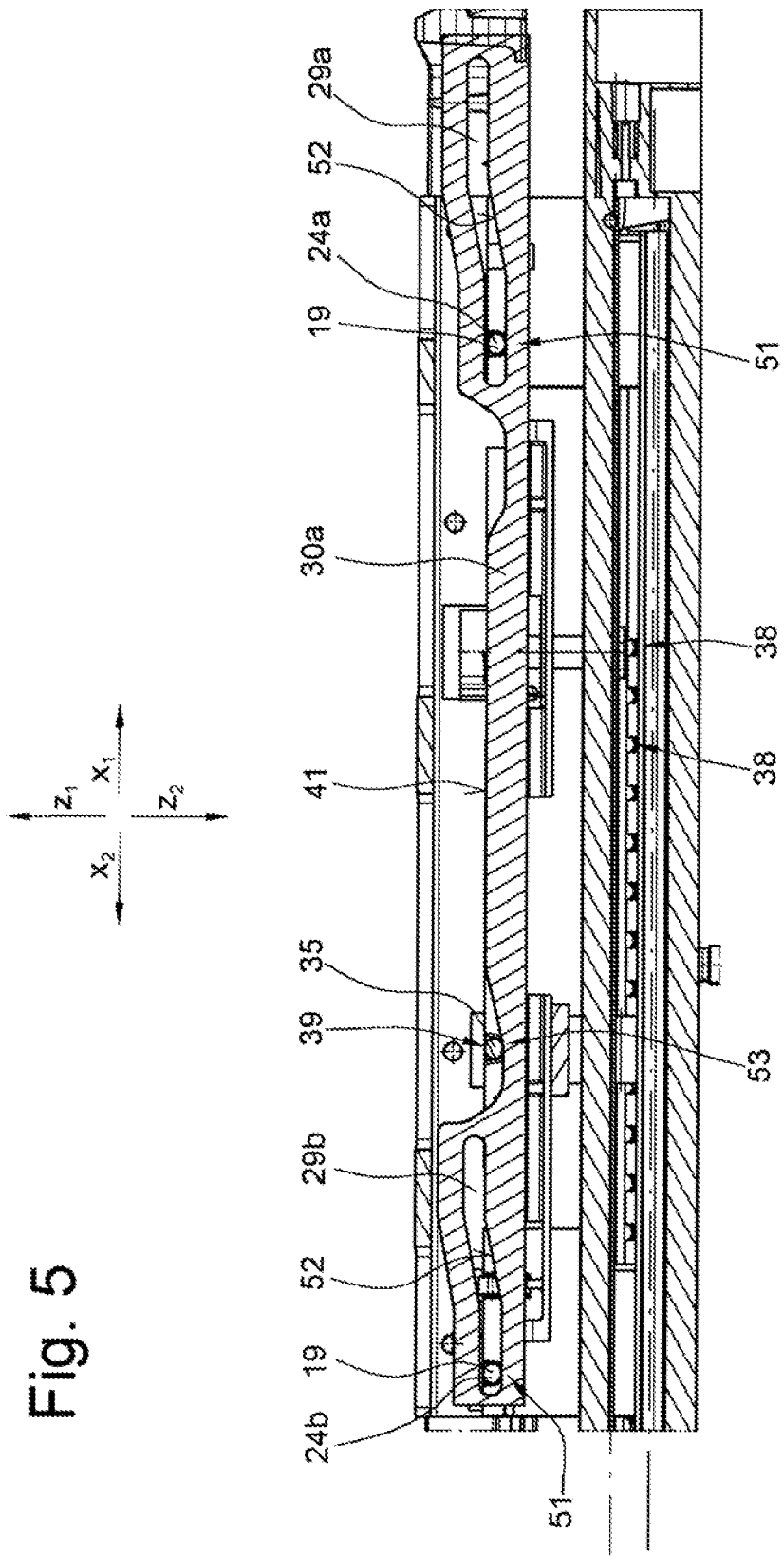
FIG. 5 is a sectional representation along section line J-J in FIG. 2.

An end region 39 of a lever arm 40 of the latch 35 is in engagement with a control surface 41 of the control element 30a (the control surface 41 is not visible in FIG. 8—see FIG. 5, for example). The latch 35 is spring-loaded such that it automatically moves into the locking position.

As per FIG. 5, end regions 19 of the two latches 24a and 24b are located in a region 51 of a control surface 52 formed by the respective gate 29a and 29b. The end region 39 of the latch 35 is arranged in a region 53 of the control surface 41. In this position of the control element 30a, the latch 35 is moved by the gate 29a into the locking position as per FIGS. 5 and 8. The latches 24a and 24b are in engagement with the overhang 28. The anchor elements 33a and 33b of the backlash compensation device 31 engage beneath the overhangs 28 and 34 (see FIG. 7).

According to FIG. 1, the locking device 20a has an actuating device 42, by means of which the X-locking mechanism 21 can be relocated separately or together with the Z-locking mechanism 22 from a locking position into a release position. The actuating device 42 comprises a handle 43, which is held on the base element 17 such that it can pivot about an axis $a_4$, as well as a handle 44, which is likewise held on the base element 17 such that it can pivot about an axis $a_5$.

By means of a transmission device 45, which comprises a lever 46 that can pivot in a clockwise direction $u_1$ and a counterclockwise direction $u_2$ about an axis $a_3$ as well as an actuating rod 47, the control elements 30a and 30b can be shifted in direction $x_2$ upon actuation of the handle 43.

The handle 44 is connected to a transmission device 48 so that the control elements 30a and 30b are moved in direction $x_2$ upon actuation of the handle 44. The transmission device 48 comprises control link 49 and an actuating rod 50 that interacts with the control elements 30a and 30b.

If the handle 43 is now actuated as per FIG. 1, the lever 46 pivots about the pivot axis $a_3$ and shifts the actuating rod 47 in direction $x_2$. The actuating rod 47 is connected to both control elements 30a and 30b in such a manner that they are likewise moved in direction $x_2$.

If, alternatively, the handle 44 is actuated, this causes—through the control link 49—the actuating rod 50 to likewise be shifted in direction $x_2$. During this process, the control elements 30a and 30b are also shifted in direction $x_2$ (see FIG. 13).

On account of the shifting of the control elements 30a and 30b in the direction $x_2$, the end regions 19 of the latches 24a and 24b are shifted relative to the gates 29a and 29b into the region 54. The Z-position of the control surface 52 has not changed during this process, however, so that the latches 24a and 24b are not pivoted, which is to say they remain in engagement with the overhang 28.

The end region 39 of the latch 35, in contrast, is moved relative to the control element 30a or 30b onto a region 55 of the respective control element 30a or 30b (see FIG. 13), in which the control surface 41 is elevated by an amount $\Delta Z$ in the direction $z_1$ in relation to the region 53. The end region 39 of the latch 35 is therefore likewise shifted by the amount $\Delta Z$ in the direction $z_1$, during which process the latch 35 has moved out of engagement with the second lock, in this case the slot 38, into the release position.

If one of the two handles 43 or 44 is first actuated and then the other handle, the control elements 30a and 30b are then shifted. During this movement, the end regions 19 are moved into contact with a region 56 of the control surface 52, in which the control surface 52 is elevated by $\Delta Z$ in the direction $z_2$ in relation to the region 51 (see FIG. 9). In this process, the latches 24a and 24b are moved out of engagement with the overhang 28. The end region 39 is shifted into the region 57 on the control surface 41. Its Z-position does not change during this movement of the control elements 30a and 30b, which is to say the latch 35 remains out of engagement with the slots 38. The fixture 11 can then be removed from the second guide.

During this movement of the latches 24a and 24b into the release position, feeler elements 58 of the locking devices 20a and 20b are moved out of recesses 59 of the base element 17. If the fixture 11 is placed back into the second guide 12, then the feeler elements 58 come into contact with the second guide 12 and in doing so move the latches 24a and 24b—through the control elements 30a and 30b—into the position as per FIG. 13 in which the latches 24a and 24b are again in engagement with the overhang 28.

If the handles 43 and 44 are moved back into the rest position, a shifting of the control elements 30a and 30b into the position as per FIG. 5, in which the latch 35 is also moved back into engagement with the guide rail 16a or 16b, follows.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A guide device for a vehicle, the guide device comprising:
    a first guide, the first guide being a part of a fixture;
    a second guide that forms a guide track along which the fixture is movably guided in first and second directions that oppose one another; and
    a locking device comprising:
        an X-movement direction locking mechanism via which a movement of the fixture along the guide track in the first and second directions is releasably locked;
        a Z-movement direction locking mechanism via which a movement of the fixture in a third direction for removal of the fixture from the second guide is releasably locked, the third direction being different from the first and second directions; and
        a first actuator and a second actuator,
    wherein the X-movement direction locking mechanism has a first lock,
    wherein the Z-movement direction locking mechanism has a primary lock, the primary lock being a pivotable latch,
    wherein the X-movement direction locking mechanism is movable from a locking position into a release position upon an actuation of the first actuator or an actuation of the second actuator,
    wherein the Z-movement direction locking mechanism is movable from a locking position into a release position upon the actuation of the first actuator and the actuation of the second actuator,
    wherein the first lock is engaged with a first control surface, wherein the primary lock is engaged with a second control surface, and wherein the first control surface and the second control surface are each movable between the locking position and the release position of each of the X-movement direction locking mechanism and the Z-movement direction locking mechanism,
    wherein the first control surface and the second control surface are parts of a control element, the control element being movable between a release position, a first locking position, and a second locking position, and
    wherein the first control surface and the second control surface are each a part of a respective gate of the control element.

2. The guide device according to claim 1, wherein the guide track of the second guide is composed of at least one guide rail.

3. The guide device according to claim 1, wherein the control element is displaced by a certain amount upon the actuation of one of the first actuator or the second actuator, and wherein the control element is additionally displaced by a certain amount upon a subsequent actuation of the other of the first actuator or the second actuator.

4. The guide device according to claim 1, wherein the control element is securable in at least the release position.

5. The guide device according to claim 1, wherein the guide track of the second guide comprises two guide rails, and the first guide comprises at least one slide element that interacts with each of the two guide rails.

6. The guide device according to claim 1, wherein the first lock is composed of a latch that is pivotably movable.

7. The guide device according to claim 1, wherein the first lock is formed as a pivotable latch having a lever arm, wherein the second guide has slots and wherein the lever arm engages with one of the slots of the second guide when the X-movement direction locking mechanism is in the locking position.

8. The guide device according to claim 1, wherein a lever arm of the pivotable latch of the Z-movement direction locking mechanism engages with an overhang of the second guide when the Z-movement direction locking mechanism is in the locking position.

9. The guide device according to claim 1, further comprising a backlash compensation device, the backlash compensation device being a part of the fixture, wherein the backlash compensation device has spring-loaded anchors that each engage with a respective overhang of the second guide.

* * * * *